(12) United States Patent
Luick et al.

(10) Patent No.: US 9,587,740 B2
(45) Date of Patent: Mar. 7, 2017

(54) REPAIRED PISTONS AND COLLECTION THEREOF

(71) Applicant: Caterpillar Inc., Peoria, IL (US)

(72) Inventors: Kegan Luick, Corinth, MS (US);
Thomas Parnell, Iuka, MS (US);
Aaron Claver, Congerville, IL (US);
Jon Shumaker, Corinth, MS (US);
Donald Clark, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 348 days.

(21) Appl. No.: 14/244,290

(22) Filed: Apr. 3, 2014

(65) Prior Publication Data

US 2014/0298987 A1 Oct. 9, 2014

Related U.S. Application Data

(60) Provisional application No. 61/809,586, filed on Apr. 8, 2013.

(51) Int. Cl.
*F16J 1/00* (2006.01)
*B23P 6/02* (2006.01)
*F02F 3/00* (2006.01)
*G06Q 50/04* (2012.01)

(52) U.S. Cl.
CPC . *F16J 1/00* (2013.01); *B23P 6/02* (2013.01);
*F02F 3/00* (2013.01); *G06Q 50/04* (2013.01);
*B23K 2201/003* (2013.01); *Y02P 90/30* (2015.11)

(58) Field of Classification Search
CPC ...... F02F 2003/0061; F16J 1/006; B23P 6/02; B23P 15/10; B23K 2201/003

USPC .............. 92/211, 213, 222, 224, 231, 260
See application file for complete search history.

(56) References Cited

U.S. PATENT DOCUMENTS

| | | | |
|---|---|---|---|
| 3,911,891 A * | 10/1975 | Dowell | B24C 11/00 123/669 |
| 4,160,048 A | 7/1979 | Jaeger | |
| 6,364,971 B1 * | 4/2002 | Peterson, Jr. | B23K 9/00 148/525 |
| 6,779,660 B1 | 8/2004 | Calvert et al. | |
| 6,915,236 B2 * | 7/2005 | Tanner | B23P 6/002 29/402.08 |
| 8,414,269 B2 * | 4/2013 | Cheng | B23P 6/007 416/229 A |
| 2002/0073982 A1 | 6/2002 | Shaikh | |
| 2004/0142109 A1 | 7/2004 | Kaufold et al. | |
| 2005/0132569 A1 * | 6/2005 | Clark | B23P 6/02 29/888.041 |

(Continued)

FOREIGN PATENT DOCUMENTS

| | | |
|---|---|---|
| CN | 1850421 | 10/2006 |
| CN | 1872488 | 12/2006 |

(Continued)

*Primary Examiner* — Nathaniel Wiehe
*Assistant Examiner* — Matthew Wiblin
(74) *Attorney, Agent, or Firm* — Jonathan F. Yates (57) ABSTRACT

A repaired piston includes a crown composed of base and welding filler materials, and having an annular rim extending around a combustion bowl. A finite number of repaired defects are within the annular rim, and have a spatial distribution limited by a multidirectional spacing parameter, and a size distribution limited by a unidirectional sizing parameter.

17 Claims, 6 Drawing Sheets

(56) References Cited

U.S. PATENT DOCUMENTS

| | | | | |
|---|---|---|---|---|
| 2014/0008330 A1* | 1/2014 | Tiwari | ..................... | B23K 9/04 |
| | | | | 219/76.14 |
| 2014/0166513 A1* | 6/2014 | Clark | ........................ | B23P 6/02 |
| | | | | 206/319 |
| 2014/0197142 A1* | 7/2014 | Wilder | ............... | B23K 26/0823 |
| | | | | 219/121.64 |

FOREIGN PATENT DOCUMENTS

| | | |
|---|---|---|
| CN | 102166702 | 8/2011 |
| CN | 102652237 | 8/2012 |
| EP | 0592179 | 4/1994 |
| EP | 1422380 | 5/2004 |
| JP | H0544838 | 2/1993 |

* cited by examiner

REPAIRED PISTONS AND COLLECTION THEREOF

RELATION TO OTHER PATENT APPLICATION

This application claims priority to provisional patent application 61/809,586, filed Apr. 8, 2013 with the same title.

TECHNICAL FIELD

The present disclosure relates generally to the field of remanufacturing, and relates more particularly to repairing a defective piston for populating an inventory of interchangeable replacement pistons.

BACKGROUND

The fields of machine component salvaging and remanufacturing have grown significantly in recent years. Systems and components that only recently would have been scrapped are now repaired and/or refurbished and returned to service. For many years machine components have routinely been "rebuilt" and used again, but often only after the component's dimensions or other features and properties are modified out of necessity from original specs. Increasing bore size during "rebuilding" on internal combustion engine will be a familiar example. It is more desirable in many instances, however, for systems and components to be remanufactured to a condition as good or better than new without modifying the specs. With this goal in mind, the development of remanufacturing strategies in certain technical areas and for certain classes of components has been rapid. In other areas, however, and in the case of certain types of machine parts, engineers continued to find it challenging to return components to a commercially and technically acceptable state, much less a condition identical to or better than new. Compounding these challenges is the tendency for even very precisely and carefully remanufactured components to still have an appearance of wear or prior use, which can lead to commercial challenges when so recognized by a potential consumer.

While all manner of techniques have been proposed for repairing cracks in components, removing corrosion, repairing surface finishes and other signs of prior use have been proposed over the years, the use of such techniques can change the material properties of the components, such as microstructure, in ways only apparent upon inspection with sophisticated instrumentation or after returning to service and observing a failure. Moreover, even where such techniques more than adequately address the technical requirements of remanufacturing, they can still render the component aesthetically unappealing. One class of machinery parts where balancing these sometimes competing goals of technical sufficiency and aesthetic appeal has proven quite challenging are internal combustion engine pistons.

Internal combustion engines have many different parts. When such an engine is taken out of service and dismantled for remanufacturing, various of the parts may be reused while others are scrapped. Reassembling an internal combustion engine once remanufactured therefore often requires the use of a mix of both remanufactured parts and new parts. In the case of pistons, it is commonplace for replacement pistons supplied for installation in a remanufactured engine to be new due to the fact that many incoming pistons removed from service are presumed to be poorly suited, if at all, for remanufacturing. U.S. Pat. No. 6,779,660 to Calvert et al. is directed to a method and apparatus for installing a prepackaged piston assembly. Calvert et al. proposed a prepackaged assembly in which a plurality of piston rings are preinstalled on a piston and a sleeve positioned about the piston and the rings to maintain the rings in a compressed position ready for installation. Calvert et al. indicate that their development reduces time and expense required for rebuilding an engine and increases the quality of the rebuild. While Calvert et al. may provide an advantageous strategy for packaging and supplying replacement pistons, the reference does not appear to provide any guidance as to obtaining the replacement piston itself from remanufactured or new sources.

SUMMARY

In one aspect, a method of processing used pistons includes receiving a collection of used pistons each removed from service in an internal combustion engine, and including a plurality of non-defective pistons, and a plurality of defective pistons each having a defect in an outer surface thereof. The method further includes sorting the collection of used pistons into a standard processing category for remanufacturing the non-defective pistons, an expanded processing category for remanufacturing defective pistons satisfying a defect weldability criterion, and a third category. The method further includes repairing the defect in each of the pistons in the expanded processing category at least in part by depositing welding filler material in a molten state onto a base material of the piston forming the defect, and machining the deposited filler material once bonded to the base material and solidified. The method still further includes populating an inventory of interchangeable replacement pistons with remanufactured pistons from both the standard and expanded processing categories but not the third category.

In another aspect, a method of preparing a used piston for returning to service in an internal combustion engine includes receiving a used piston sorted from a collection of used pistons on the basis of a defect in an outer surface thereof into an expanded processing category for remanufacturing. The method further includes repairing the defect at least in part by depositing welding filler material in a molten state onto a base material of the piston forming the defect, and machining the deposited filler material once bonded to the base material and solidified. The method still further includes forwarding the piston once repaired to an inventory of interchangeable replacement pistons populated from both the expanded processing category and a standard processing category for remanufacturing.

In still another aspect, an inventory of replacement pistons includes a plurality of standard pistons each including a remanufactured piston body having a skirt and an attached crown defining a combustion bowl surrounded by an annular piston rim, and being uniformly composed of a base material such that the standard pistons each have an identical material composition. The inventory further includes a plurality of non-standard pistons each including a remanufactured piston body having a skirt and an attached crown defining a combustion bowl surrounded by an annular rim. The piston bodies in the non-standard pistons are non-uniformly composed of the base material and a welding filler material bonded to the base material to repair a defect therein, and such that the non-standard pistons each have a unique material composition. Each of the standard and nonstandard pistons further include an outer surface on the corresponding piston body, and the outer surfaces satisfying a common set of specifications, such that the standard and non-standard pistons are interchangeable for returning to service in internal combustion engines.

In still another aspect, a repaired piston includes a piston body defining a longitudinal axis, and including a first body end having a crown, a second body end having a skirt, and an outer body surface extending axially between the first and second body ends and circumferentially around the longitudinal axis. The crown is composed of a base material and a welding filler material, and includes an annular rim extending circumferentially around a combustion bowl and in a radially outward direction from the combustion bowl to the outer body surface. The annular rim is formed primarily of the base material and secondarily of the welding filler material, and has therein a finite number of repair defects each formed by a void in the base material filled by the welding filler material or by a mixture of the base material and the welding filler material. The repaired defects have a spatial distribution limited by a multidirectional spacing parameter, such that a distance, in any direction, between any two of the repaired defects is at least as great as a diameter of either of the two. The repaired defects further have a size distribution limited by a unidirectional sizing parameter varying as a function of a distance from the combustion bowl, and such that each of the repaired defects has a diameter of about 40% or less of a distance, in the radially outward direction, of the repaired defect from the combustion bowl.

In still another aspect, a collection of repaired pistons includes a plurality of piston bodies each defining a longitudinal axis, and including a first body end having a crown, a second body end having a skirt, and an outer body surface extending axially between the first and second body ends and circumferentially around the longitudinal axis. The crowns of each of the plurality of piston bodies are composed of a base material and a welding filler material, and include an annular rim extending circumferentially around a combustion bowl and in a radially outward direction from the combustion bowl to the outer body surface. The annular rims are formed primarily of the base material and secondarily of the welding filler material, and have therein a finite number of repaired defects each formed by a void in the base material filled by the welding filler or by a mixture of the base material and the welding filler material. The repaired defects have a spatial distribution within each of the annular rims limited by a multidirectional spacing parameter, such that a distance, in any direction, between any two repaired defects in any one of the annular rims, as a mean among the collection, is as least as great as a diameter of either of the two. The repaired defects further have a size distribution within each of the annular rims limited by a unidirectional sizing parameter varying as a function of distance from the corresponding combustion bowl, and such that the repaired defects have diameters, as a mean among the collection, of about 40% or less of a distance, in the corresponding radially outward directions, of the repaired defects from the corresponding combustion bowl.

In still another aspect, a repaired piston includes a piston body defining a longitudinal axis, and including a first body end having a crown, a second body end having a skirt, and an outer body surface extending axially between the first and second body ends and circumferentially around the longitudinal axis. The crown is composed of a base material and a welding filler material, and includes an annular rim extending circumferentially around a combustion bowl and in a radially outward direction from the combustion bowl to the outer body surface. The annular rim is formed primarily of the base material and secondarily of the welding filler material and has therein a finite number of repaired defects each formed by a void in the base material filled by the welding filler material or by a mixture of the base material and the welding filler material. The repaired defects have a spatial distribution limited by a multidirectional spacing parameter, such that a distance, in any direction, between any two of the repaired defects is as at least as great as a diameter of either of the two. The repaired defects further have a size distribution limited by a unidirectional sizing parameter varying as a function of distance from the combustion bowl, and such that a diameter of each of the repaired defects is equal to or less than $D_{MAX}$ according to the equation:

$$D_{MAX} = A*B + C$$

where;

A and C are constants; and

B is the percentage of a distance from the combustion bowl to the outer body surface, determined by a location of the repaired defect.

DETAILED DESCRIPTION

Figure 1:
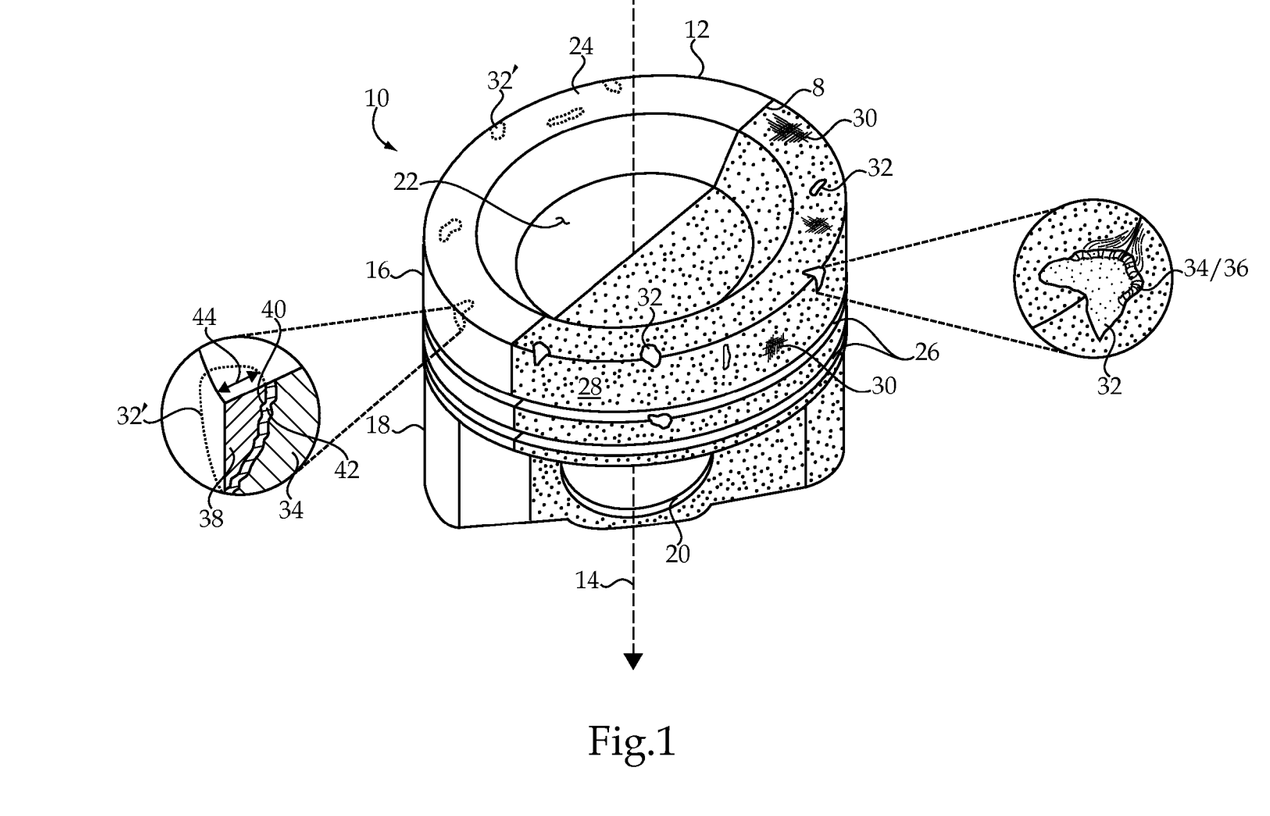
FIG. 1 is a diagrammatic before-and-after view of a piston showing one piston half prior to remanufacturing and the other piston half after remanufacturing according to the present disclosure.

Referring to FIG. 1, there is shown a piston 10 having a piston body 12, and having been removed from service in an internal combustion engine. In FIG. 1 a line 8 is shown on piston body 12. Piston body 12 is illustrated on the right side of line 8 as it might appear prior to being remanufactured according to the present disclosure, and depicted on the left side of line 8 as it might appear after having been remanufactured. Piston body 12 includes a piston crown 16 and a piston skirt 18 and defines a longitudinal axis 14. A wrist pin bore 20 extending normal to axis 14 is formed in skirt 18 and configured to receive a wrist pin for coupling piston body 12 with a piston rod in a conventional manner. A combustion bowl 22 is formed in crown 16 and is surrounded by an annular rim 24 circumferential of axis 14. A plurality of piston ring grooves 26 are formed in an outer surface 28 of piston body 12 within crown 16, and also extend circumferentially around longitudinal axis 14. To the right side of line 8 are shown a plurality of corroded areas 30 and a plurality of defects 32. Defects 32 may have the form of dings, dents, pits or scratches, for example. A detailed enlargement of one of the defects 32 is also shown in FIG. 1. Upon or after removing a used piston from service, during handling or processing pistons can sometimes be banged against parts of the engine being dismantled, against each other in a salvage pile, or otherwise strike something with sufficient force to cause damage. In some instances, defects 32 may be formed by a base material 34 of piston body 12 which is displaced, meaning not actually removed, by striking the piston against something else. In FIG. 1, displaced base material 36 is shown in the detailed enlargement, having been pushed out of its intended location to create a void. In other instances, base material 34 might not be merely displaced but instead chipped, cut or flaked away to form a void. In either case, the presence of the void can violate specifications as to surface finish of a new or as good as new piston. For reasons which will be apparent from the following description, repair of these and other types of defects with sufficient quality that a piston can be returned to original specifications has long been elusive.

On the left side of line 8 in FIG. 1 are shown a plurality of repaired defects 32', one of which is shown in a sectioned view by way of another detailed enlargement. As noted above, piston body 12 may be formed of a base material 34 which is the cast metallic material such as steel or iron used in originally manufacturing the piston. Defects 32 may be repaired during remanufacturing piston 10 at least in part by depositing welding filler material 38 in a molten state onto base material 34 which forms the defect, and machining deposited filler material 38 once bonded to base material 34 and solidified. In FIG. 1, repaired defects 32' will typically not be visible to the naked eye, and are thus shown in phantom. A bondline 40 resides between solidified filler material 38 and base material 34 and adjoins a heat affected zone 42. A depth 44 of repaired defect 32' showed in the detailed enlargement is also illustrated, and in certain embodiments may be about 2.0 millimeters (mm) or less. The other dimensions of repaired defect 32', height and width, might also be about 2.0 mm or less. As used herein, the term "about" should be understood in the context of conventional rounding to a consistent number of significant digits. Accordingly, "about" 2.0 mm means from 1.95 mm to 2.04 mm, and so on. A thickness of heat affected zone 42 may be about 0.2 mm or less in certain embodiments.

Those skilled in the field of remanufacturing will be familiar with the general principle of returning a used component to a condition as good as or better than new. For remanufactured parts a set of specifications such as tolerances and surface finishes known from newly manufactured parts will typically be applied to the remanufacturing of used parts. In the present instance, piston 10 is remanufactured such that it satisfies the same set of specifications as that of a new piston. Among these specifications may be surface finish. While quantitative surface finish specifications are contemplated herein, in many instances, the surface finish specification relied upon might be qualitative, prescribing the existence of no defects or anomalies in surface finish visible to the naked eye when a piston is at arm's length, for example, or for that matter at any distance, from an observer. As noted above, the manner of repairing defects in piston body 12 to satisfy such a specification contemplates depositing welding filler material 38 onto base material 34.

In the illustrated case shown by way of the detailed enlargements in FIG. 1, the defects repaired may be understood as specification-violating voids in outer surface 28 within crown 16. Corroded areas 30 may also be understood as specification-violating defects, and in some instances might be deposits of foreign material on piston body 12, corroded base material of piston body 12, base material which is corroded and pitted to a porous state, or still another feature. In other words, corroded areas 30 might themselves be understood in certain instances as specification-violating voids where porous, and thus repaired via the deposition of welding filler material, but in other instances might be defects that are repaired by some other technique not requiring the addition of filler material. Practical examples of suitable repair techniques will be further understood by way of the following description.

Figure 2:
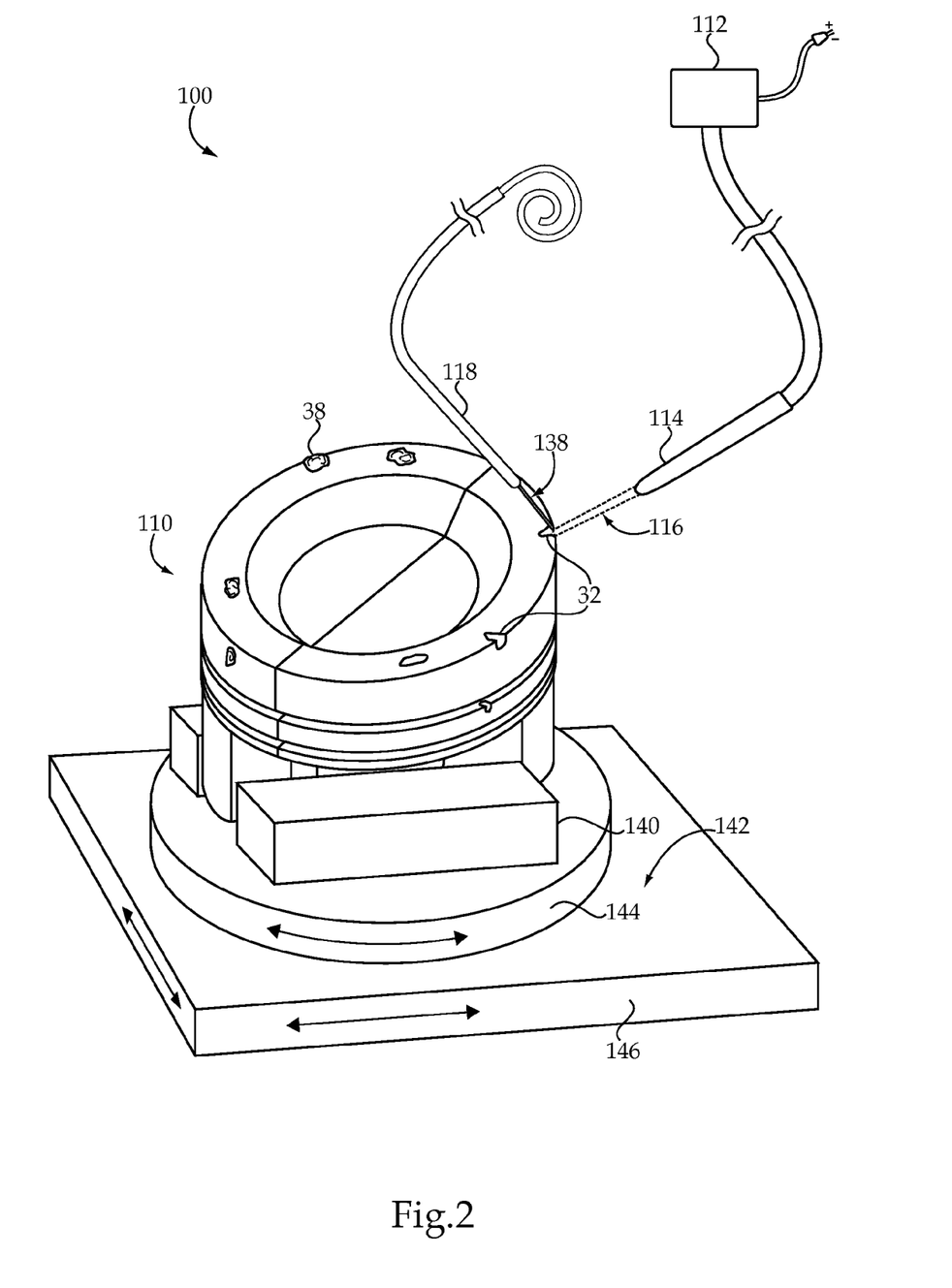
FIG. 2 is a diagrammatic view of a piston at an example stage of remanufacturing, according to one embodiment.

Referring now to FIG. 2, there is shown a piston 110 similar to piston 10 of FIG. 1 and positioned at a welding station 100 as it might appear in the process of being repaired. While piston 110 may be of the same type as piston 10, each defective piston repaired according to the techniques described herein can be expected to have a unique set of one or more defects. Accordingly, since welding filler material will be deposited onto base material to repair the unique set of defects, defective pistons once repaired may be understood to each have a unique material composition comprised of the base material of the piston plus welding filler material in unique locations and/or unique amounts and/or of unique shapes. In contrast, used pistons which are remanufactured without welding repair as described herein may be formed solely of the base material and thus have identical material compositions.

In FIG. 2, piston 110 is shown positioned upon a fixture 140 of welding station 100. Fixture 140 may be coupled to a positioning mechanism 142 having a rotatable base 144 and a translatable support 146 which enable piston 110 to be rotated and translated relative to a laser 114 of welding station 100. Laser 114 may have a power supply 112 and is configured to generate a beam 116 which by its heat energy melts welding filler material in the form of a wire 138. Wire 138 is shown fed through a wire feeder 118 but could also be positioned appropriately by hand. It may be noted that beam 116 is oriented such that a defect 32 currently being repaired is within a beam path of beam 116. Wire 138 is likewise within the beam path such that beam 116 melts both base material of piston 110 and wire 138, to deposit the welding filler material in a molten state into defect 32 where it is allowed to solidify and bonds with the base material.

In FIG. 2, solidified welding filler material 38 is shown having been deposited within a plurality of repaired, although not yet finished, defects in piston 110, while a number of other defects 32 have not yet been welded. In a practical implementation strategy, a power output of laser 114 may be less than 100 watts, and beam 116 may be pulsed for a pulse duration less than 20 milliseconds (ms). More particularly, the power output may be about 60 watts, the pulse duration may be about 10 ms at a frequency of about 2 Hz, and a beam diameter of laser 114 may be about 2 mm or less. Once a defect is welded as described herein, piston 110 may be adjusted via positioning mechanism 142 to locate another defect for welding until each of the defects in piston 110 have been welded. Piston 110 may then be forwarded to a subsequent processing station for further treatment.

INDUSTRIAL APPLICABILITY

Figure 3:
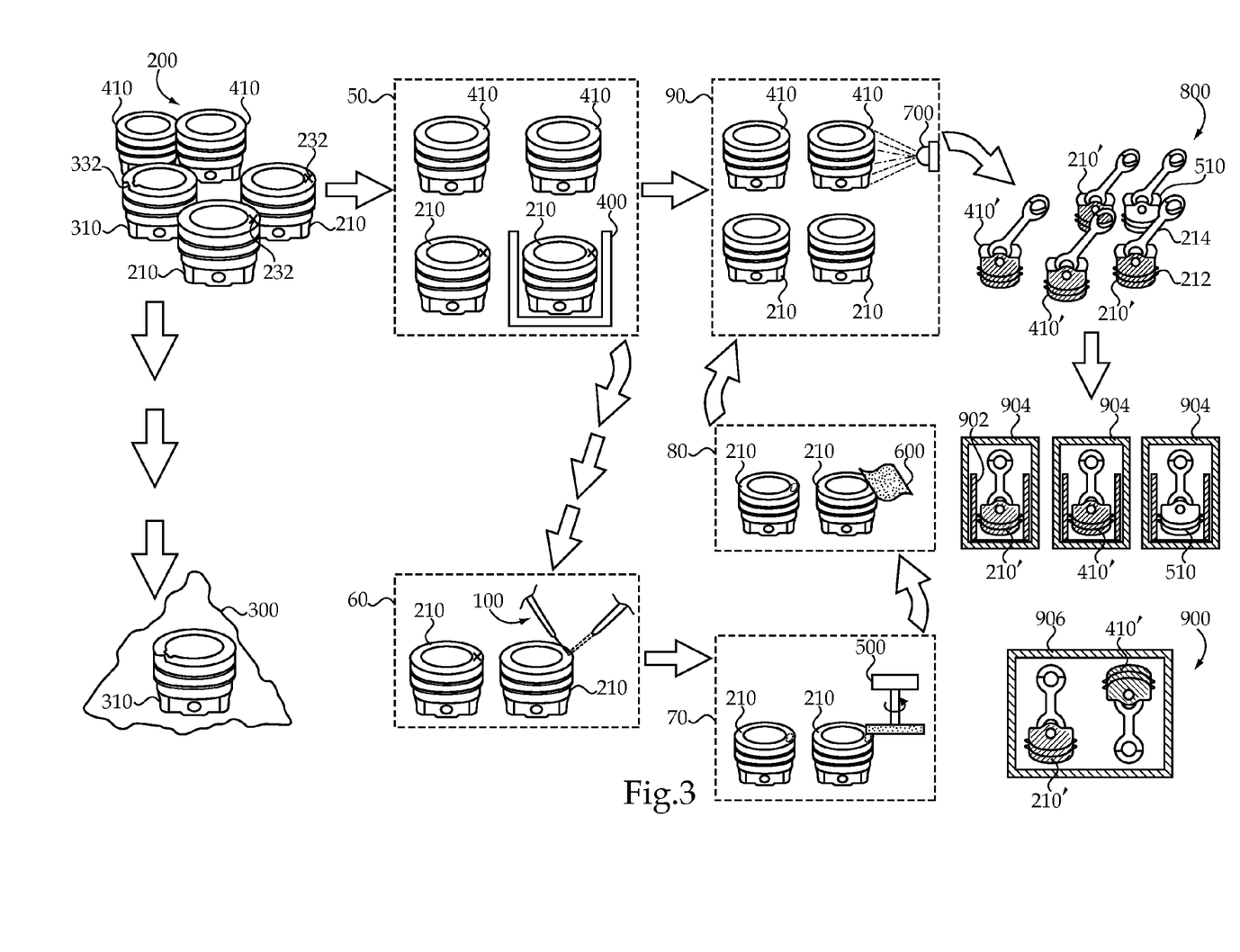
FIG. 3 is a diagrammatic view illustrating multiple stages of a piston processing strategy, according to one embodiment.

Referring to FIG. 3, there is shown a diagrammatic illustration of multiple stages of a used piston processing strategy for populating an inventory of interchangeable replacement pistons, according to one embodiment. The procedures depicted in FIG. 3 commence by receiving a collection 200 of used pistons each removed from service in an internal combustion engine, which might be the same engine or multiple engines. Receiving collection 200 may include receipt of a shipment, or taking custody of warehoused pistons, for example. Collection 200 may include a plurality of non-defective pistons 410, and a plurality of defective pistons 210 and 310 each having a defect in an outer surface thereof. As discussed above, when pistons are removed from an internal combustion engine, it is common for handling of some of the pistons to cause dings, scratches, dents, etc. in outer surfaces of the pistons. Pistons 210 in collection 200 each include such a defect 232, and piston 310 includes a more significant defect 332. Other pistons received have no defects and are shown as non-defective pistons 410 in collection 200.

In preparation for processing, collection 200 may be sorted into a standard processing category for remanufacturing the non-defective or standard pistons 410, an expanded processing category for remanufacturing defective or non-standard pistons satisfying a defect weldability criterion, and a third category. Sorting of collection 200 may be understood as dividing collection 200 among the three categories on the basis of whether there is a defect in a given piston at all, and if so, whether the defect is amenable to repair via the welding techniques set forth herein. In the case of piston 310 defect 332 may be determined upon inspection to be not amenable to the present repair techniques, thus fails to satisfy the defect weldability criterion and sorted into the third category for routing to scrap. A scrap collection 300 of defective pistons is shown in FIG. 3 receiving piston 310. With pistons failing to satisfy the defect weldability criterion sorted out, the other pistons in collection 200 which are non-defective, pistons 410, may undergo standard processing for remanufacturing, while the defective pistons, pistons 210, which need to and can be repaired may undergo expanded processing.

In any case, pistons 410 and 210 sorted from collection 200 may next be forwarded to a processing stage 50 for cleaning. At stage 50, one of pistons 210 is shown within a cleaning mechanism 400 which might be a washer, grit blaster or some other cleaning mechanism. After processing at stage 50, pistons 210 may be forwarded to another processing stage 60 for repairing the defects at welding station 100 in the manner described herein. Once repaired, from stage 60 pistons 210 may be forwarded to another processing stage 70 for machining the welded defects via a machining mechanism 500. From stage 70, pistons 210 may be forwarded to yet another processing stage 80 at which a sanding mechanism 600, which could be manual use of sandpaper or the like, is used to blend the machined areas treated at stage 70. From stage 80, pistons 210 may be forwarded to yet another processing stage 90. Pistons 410 may be forwarded from processing stage 50 to processing stage 90 to be combined with pistons 210. In stage 90 all of pistons 410 and 210 may be treated via a spraying mechanism 700 to apply a suitable, known break-in coating.

FIG. 3 represents only some of the various processing stages that might be used, and additional steps of inspection, cleaning and possibly repair of other types of defects might be implemented. It will nevertheless be apparent that pistons 210 will be forwarded through an expanded series of processing stages as compared with pistons 410, hence, pistons 210 are remanufactured according to a non-standard series of processing stages whereas pistons 410 are processed according to a standard series of processing stages having a lesser number of steps than the non-standard series. By way of analogy, collection 200 may be thought of as a pool which is divided into a first stream of non-repairable pistons flowing to scrap, a shorter remanufacturing stream for pistons needing only minimal processing to be made ready for returning to service, and a longer remanufacturing stream for pistons which need repairing before they are ready for returning to service. The shorter and longer streams split after stage 50, and recombine at stage 90 at which point the non-defective pistons and the repaired defective pistons are interchangeable for returning to service and are outwardly indistinguishable.

From stage 90, pistons 410 and 210 may be forwarded to populate an unpackaged inventory 800 of interchangeable replacement pistons, each shown as a piston assembly. In particular, unpackaged inventory 800 is shown having a plurality of remanufactured piston assemblies 210' each having piston rings 212 and a piston rod 214 coupled with the corresponding remanufactured piston. Piston assemblies 410' are shown which each include one of pistons 410 and also piston rings and a piston rod. Inventory 800 might of course consist of loose pistons. Also populating unpackaged inventory 800 is a new piston assembly 510. In a practical implementation strategy, unpackaged inventory 800 will thus be populated with remanufactured pistons from both the standard and expanded processing categories, but not the third, scrap category. Inventory 800 may also be populated with at least one new piston or piston assembly.

It will be recalled that pistons repaired according to the techniques described above, non-standard pistons 210, may each have a unique material composition, resulting from welding filler material being used to repair a unique pattern of defects. Since the standard pistons, pistons 410, are not repaired in such a way, each of pistons 410 may be understood to have an identical material composition. Outer surfaces of the piston bodies in each of the standard and non-standard pistons, that is the standard and expanded processing categories, may nevertheless appear identical to the outer surfaces of the non-standard pistons 210, as they are formed to satisfy a set of specifications common with that for the outer surfaces of the standard pistons. As a result, both standard pistons 410 and non-standard pistons 210 once remanufactured are interchangeable for returning to service in internal combustion engines, both from the standpoint of expected performance and aesthetic appearance.

Also shown in FIG. 3 is a packaged inventory 900 of piston assemblies. In a practical implementation strategy, packaged inventory 900 may include a first group of engine service packages 904 containing both standard and non-standard pistons as parts of piston assemblies 210' and 410' in a first service package configuration, and a second group of engine service packages 906 also containing both standard and non-standard pistons as parts of piston assemblies 210' and 410' in a second service package configuration. In certain embodiments, the first group of service packages 904 may include both standard and non-standard pistons in the piston assemblies each packaged with a cylinder liner 902 to form a ready-for-installation cylinder pack. Service packages 904 and 906 may each also include one or more service packages containing new piston assembly 510.

It will be recalled that sorting of defective pistons 210 from defective pistons 310 in collection 200 may occur based upon whether defects in these various pistons satisfy a defect weldability criterion. Those skilled in the art will be familiar with the desirability of machine repairs having as little effect as practicable on the composition, and thus ultimately on the integrity and expected service life of a part being repaired. To this end, it has been discovered that certain defects can be successfully and economically repaired via the present repair techniques, while others cannot. In one embodiment, the defect weldability criterion includes a defect size limit. The defect size limit may be an upper size limit of a defect, which is indicative of the expected size of a heat affected zone to be formed in the defective piston via the presently described welding repair techniques. In other words, defects having a certain size may be associated with heat affected zones which are too large to allow the piston to be practicably made ready for returning to service.

Figure 4:
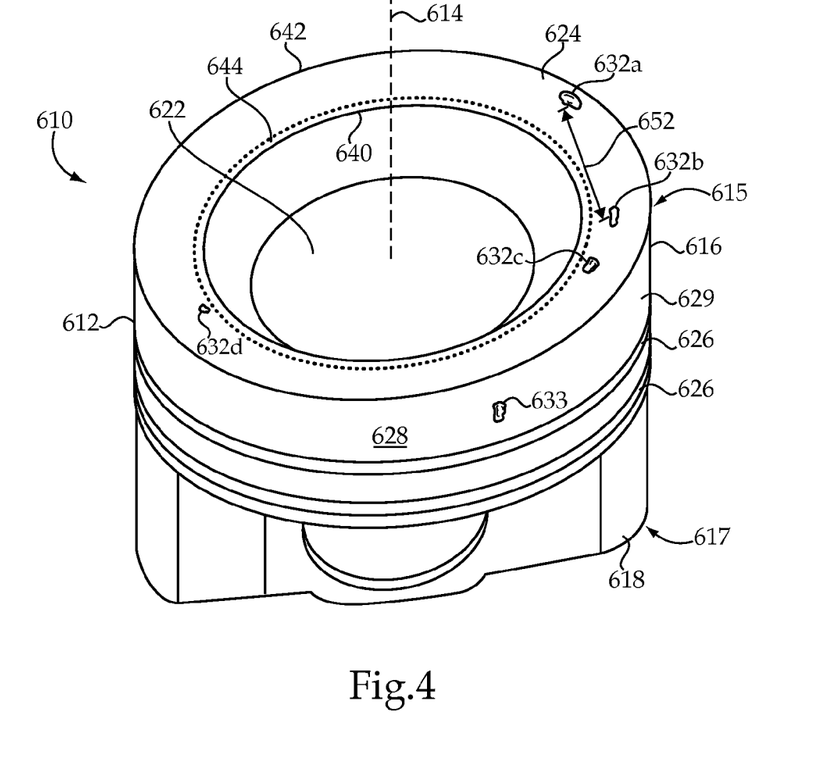
FIG. 4 is a diagrammatic view of a repaired piston, according to one embodiment.
Figure 5:
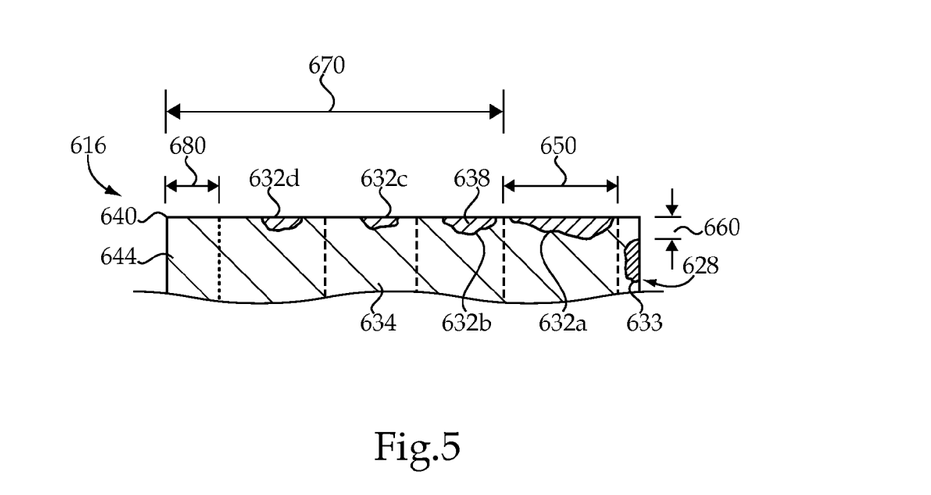
FIG. 5 is a profile of rotation through part of the repaired piston of FIG. 4.

Turning now to FIG. 4, there is shown another repaired piston 610 in accordance with the present disclosure. Piston 610 may be substantially identical to other pistons discussed herein, apart from a unique pattern of repaired defects inherent to most any piston to be repaired according to the present disclosure. Moreover, the teachings discussed with regard to piston 610 and those subsequently described may be generally applied to repair and remanufacturing of any of the pistons and processing techniques contemplated herein, and vice versa. Piston 610 includes a piston body 612 defining a longitudinal axis 614, and including a first body end 615 having a crown 616, and a second body end 617 having a skirt 618. An outer body surface 628 extends axially between first and second body ends 615 and 616 and circumferentially around axis 614. Crown 616 further includes an annular rim 624 extending circumferentially around a combustion bowl 622 and in a radially outward direction from combustion bowl 622 to outer body surface 628. A plurality of ring grooves 626 are formed in outer body surface 628, and a top land 629 extends from an uppermost one of grooves 626 to annular rim 624. Annular rim 624 also has therein a finite number of repaired defects 632a-d. Another repaired defect 633 is located within top land 629. Referring also to FIG. 5, there is shown a composite profile of rotation about axis 614 through crown 616 such that each of the repaired defects is illustrated in the same view. Crown 616 is composed of a base material 634 and a welding filler material 638, and annular rim 624 is formed primarily of base material 634 and secondarily of filler material 638, similar to foregoing embodiments. Repaired defects 632a-d, as well as repaired defect 633, are each formed by a void in base material 634 filled by filler material 638 or by a mixture of base material 634 and filler material 638.

As discussed above, sorting of pistons in accordance with the present disclosure may be based upon certain criteria relating to capability of being practicably repaired and remanufactured. In addition to the foregoing criteria relating to absolute defect size, a number of other interrelated variables including proximity of a defect to other defects and to certain piston features, defect size as a function of location, and potentially still others may be criteria upon the basis of which pistons are sorted, and thus selected to be repaired or not. Piston 610 is an example of a piston satisfying such criteria, which collectively can be understood to relate to a spatial distribution of defects and to a size distribution of defects. These two factors are generally preserved during remanufacturing such that repaired defects 632a-f and 633 retain the same or similar characteristics which led to selection of piston 610 for repair and remanufacturing in the first place.

In this vein, repaired defects 632a-d may have a spatial distribution within annular rim 624 limited by a multidirectional spacing parameter, such that a distance, in any direction, between any two of repaired defects 632a-d is at least as great as a diameter of either of the two. In FIG. 4, a distance 652 from a geometric center of repaired defect 632a to that of repaired defect 632b is shown. It may be noted that distance 652, as well as analogous but unlabeled distances between any other combination of two of defects 632a-d, is greater than a diameter of either of the two. "Either" of the two means both of the two, considered individually. As used herein, the term "diameter" used in connection with repaired defects will be understood to be a so-called major diameter, corresponding to the largest linear dimension in three-dimensional space that is defined by any one of the repaired defects. Accordingly, a diameter could be a diameter in a plane defined by annular rim 624, such as a diameter in a radial direction or a circumferential direction, and could also be a diameter in a direction transverse to the plane, and in the case of a direction normal to the plane, a depth of the respective repaired defect from an exposed surface of annular rim 624.

Repaired defects 632a-d may further have a size distribution limited by a unidirectional sizing parameter varying as a function of distance from combustion bowl 622. An inner perimetric edge 640 is located where annular rim 624 adjoins combustion bowl 622, and an outer perimetric edge 642 is located where annular rim 624 adjoins outer body surface 628. For purposes of understanding the unidirectional sizing parameter and its variance as a function of distance from combustion bowl 622, inner perimetric edge 644 can be understood as an outer edge of combustion bowl 622. Thus, a distance from combustion bowl 622 may be the same as a distance from edge 644. In a practical implementation strategy, the unidirectional sizing parameter may vary in direct proportion to a distance from combustion bowl 622, in a radially outward direction aligned with a radius originating at axis 614. As will be further understood by way of the following description, the size distribution may be limited such that each of repaired defects 632a-d has a diameter of about 40% or less of a distance, in the radially outward direction, of the repaired defect 632a-d from combustion bowl 622. For instance, take any one of repaired defect 632a-d and determine its diameter. That diameter will typically be equal to about 40%, or less, of the linear distance in a radially outward direction that a center of the repaired defect exposed on annular rim 624 lies from combustion bowl 622.

Other dimensional and proportional attributes of piston 610 will be further understood by way of the features depicted in FIG. 5. In a practical implementation strategy, repaired defects 632a-d may be located outside of a standback zone 644 in annular rim 624. Standback zone 644 may be free of repaired defects and extends in the radially outward direction from inner perimetric edge 640. It has been discovered that the standback zone 644 is an area of piston 610, and analogous pistons, which can be subjected to relatively extreme temperatures and thermal cycling during service in an internal combustion engine. For at least this reason, were piston 610 to have had any defects otherwise considered practicably repairable, but within standback zone 644, piston 610 would potentially have been scrapped. It should be noted that standback zone 644 will typically be free of repaired defects, but not necessarily completely free of any feature such as a tiny pit, corroded area, or scratch which could be understood as a defect. Any such defects would likely be ignored if piston 610 is otherwise repairable. In a further practical implementation strategy, a radial extent, shown via reference numeral 680 in FIG. 5, of standback zone 644 may be from about 10% to about 15% of a radial distance from inner perimetric edge 644 to outer perimetric edge 642. More particularly, radial extent or dimension 680 may be about 12% of the radial distance, and in certain embodiments may be from about 2 mm to about 3 mm. Also shown in FIG. 5 are relative diameters and depths of defects 632a-d. In particular, a diameter 650 of repaired defect 632a is shown. Diameter 650 may be about 8 mm or less, whereas analogously defined diameters of defect 632b-d may be less than diameter 650, although not necessarily less so long as the other defects satisfy criteria for repair. In other words, piston 610 might have a relatively large repaired defect close to outer perimetric edge 642 and a relatively smaller repaired defect located more radially inward, so long as the unidirectional sizing parameter is satisfied.

Also shown in FIG. 5 is a depth dimension 660 of defect 632a. Depth dimension 660 may be about 1 mm or less in certain instances. While pistons contemplated herein need not have any particular pattern of diameters or depths, in certain cases applying the sorting and reparability criteria discussed herein can result in a piston such as piston 610 where repaired defects 632a-d have among them, in the radially outward direction, at least one of, progressively increased diameters, and progressively increased depths, and in some instances both. The finite number of repaired defects 632a-d may be less than 20 in many instances, and potentially less than 10, however, limitations on the number of repair defects will tend to be based upon a relative local cost of machining time and potentially other factors such as material costs. Hence, pistons having a finite number of repaired defects greater than 20, greater than 50, or even more could still fall within the scope of the present disclosure.

It will be recalled that defects 632a-d may have diameters of about 40% or less of a distance, in the radially outward direction, of the repaired defect from combustion bowl 622. In FIG. 5, a distance from a center of defect 632a to inner perimetric edge 640 is shown via reference numeral 670. It will be readily noted that diameter 650 is relatively close to but less than 40% of distance 670. In the course of repairing pistons according to the present disclosure, it can be expected that pistons will at least occasionally be repaired having repaired defects at the limits of size allowed by the unidirectional sizing parameter. Accordingly a first and a second repaired defect, positioned at first and second distances from the combustion bowl, respectively, could each have a diameter at the maximum allowable size for their respective locations. In still other instances, all of the repaired defects could have maximum allowable diameters, or none of them.

Figure 6:
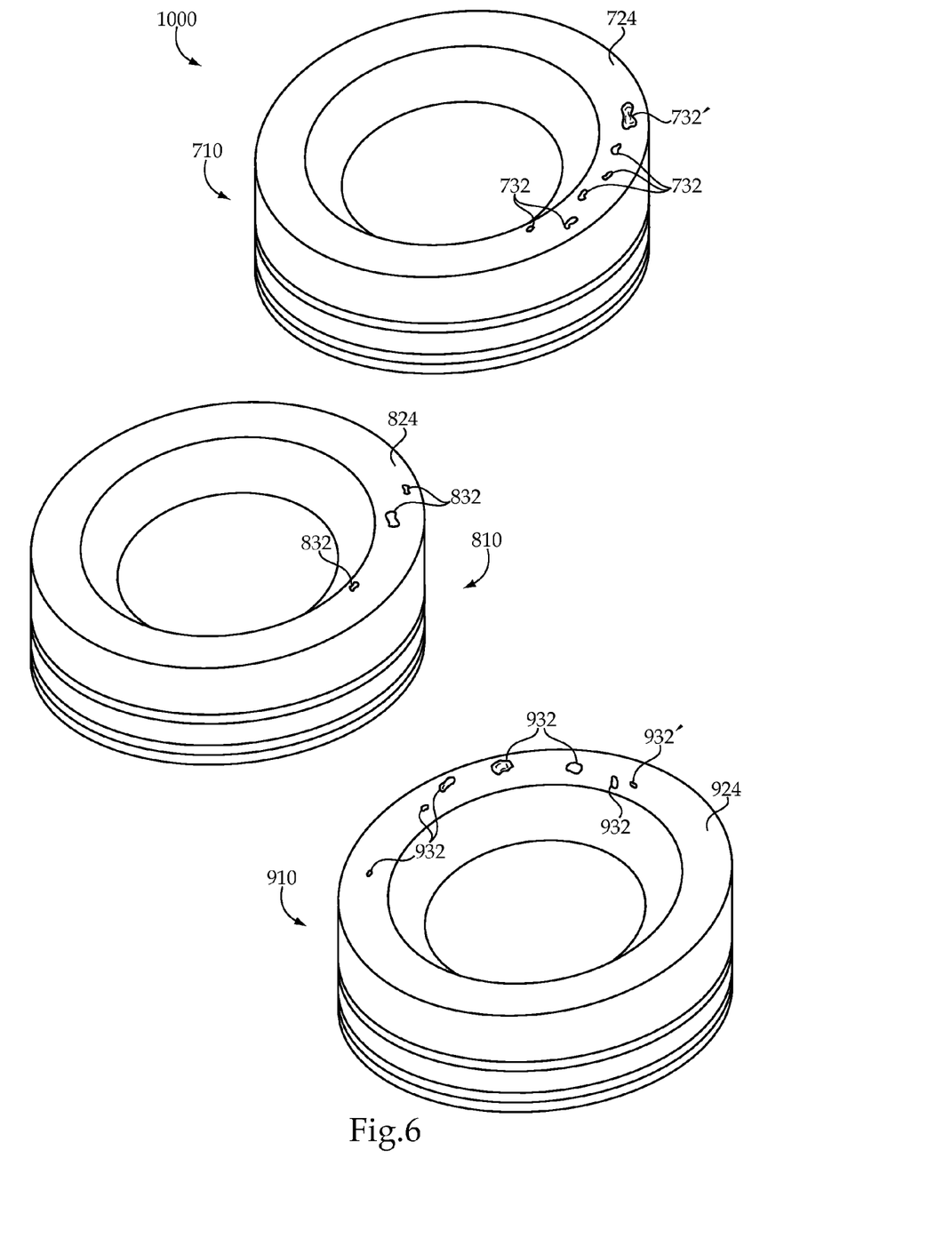
FIG. 6 is a diagrammatic view of a collection of repaired pistons, according to one embodiment.

Referring now to FIG. 6, there is shown a collection 1000 of repaired pistons 710, 810, 910, according to the present disclosure. Each of pistons 710, 810 and 910 may be substantially identical to other pistons discussed herein, apart from unique patterns of repaired defects. Piston 710 includes an annular piston rim 724 with a plurality of repaired defects 732 and 732' therein. Piston 810 includes an annular rim 824 with a plurality of defects 832 therein, and piston 910 a piston rim 924 with a plurality of repaired defects 932 and 932' therein. Among collection 1000, the repaired defects in each of pistons 710, 810 and 910 may have a spatial distribution within each annular rim 724, 824 and 924 limited by a multidirectional spacing parameter much like piston 610 described above. The repaired defects may similarly have a size distribution within rims 724, 824 and 924 limited by a unidirectional sizing parameter varying as a function of distance from the corresponding combustion bowl.

It will be recalled that in the case of piston 610, the spatial distribution is limited such that a distance, in any direction, between any two of the repaired defects is at least as great as a diameter of either of the two. It will also be recalled that in the case of piston 610 the repaired defects have a size distribution limited such that each of the repaired defects has a diameter of about 40% or less of a distance, in the radially outward direction, of the repaired defect from the combustion bowl. In the case of collection 1000, the multidirectional spacing parameter and unidirectional sizing parameter are satisfied collectively by pistons 710, 810 and 910. In particular, in collection 1000 the repaired defects have a spatial distribution such that a distance, in any direction, between any two repaired defects in any one of rims 724, 824 and 924, as a mean among collection 1000, is at least as great as a diameter of either of the two repaired defects. Analogously, the repaired defects in collection 1000 have a size distribution limited such that the repaired defects have diameters, as a mean among collection 1000, of about 40% or less of a distance, in the corresponding radially outward directions, of the repaired defects from the corresponding combustion bowl.

In many instances, the spacing and sizing parameters will be applied strictly, but in other instances some freedom may be granted to a technician to use his or her judgment as to whether a given piston should be repaired, or whether a particular defect should be repaired. In other words, where repairing and remanufacturing a relatively large number of pistons, potentially in the hundreds, thousands, or more, at the discretion of a technician certain pistons and/or certain defects within a piston may be repaired which literally fall outside of the multidirectional spacing parameter and unidirectional sizing parameter. The collection of pistons as a whole will nevertheless still have repaired defects with spatial and size distributions, on the average, adhering to those parameters. In the case of piston 710, it may be noted that repaired defect 732' could be understood as relatively closer to a nearest one of repaired defects 732 than a diameter of repaired defect 732'. It may also be noted that repaired defect 732' could fairly be said to have a diameter which is greater than 40% of a distance of defect 732' from the combustion bowl of piston 710, thus as an individual piston violating the unidirectional sizing parameter. In the case of defects 732 and 732' in piston 710, it may be noted that of the six defects two could be considered relatively closer than a diameter of one of the two, thus as an individual piston violating the multidirectional spacing parameter. Defects 732 and 732' might be understood to be spaced from one another a distance of about one half the diameter of defect 732'. The other defects, and distances between any two of them would be understood as greater than a diameter of either of the two. Likewise, defects 932' and the nearest other defect 932 in piston 910 could be fairly considered closer to one another than a diameter of one of the two. But taken collectively, a mean distances separating defects within annular rims 724, 824 and 924 are as least as great as diameters of any of the two subject defects. Stated another way, spacing between any two repaired defects within any one of pistons 710, 810, and 910 will, as a mean among collection 1000, be less than 100% of a diameter of either of the two. A similar analysis leads to the conclusion that, as a mean among the collection, diameters of each repaired defect are about 40% or less of a distance, in the corresponding radially outward directions, of the subject defect from the corresponding combustion bowl.

The size limitations imparted by applying the unidirectional sizing parameter varying as a function of distance from a combustion bowl may further be understood in view of the equation:

$$D_{MAX} = A*B + C$$

where;

$D_{MAX}$=maximum repaired defect diameter;

A and C are constants; and

B is the percentage of a distance from the combustion bowl to the outer body surface, determined by a location of the repaired defect.

It has been discovered that practicably allowable defect size according to the present disclosure may vary substantially linearly with distance from the combustion bowl. The term $D_{MAX}$ set forth in the above equation may be understood as a maximum allowable diameter of any one of the defects, and may be equal to the constant A multiplied by the percentage of the distance determined by a location of the subject defect from the combustion bowl to the outer body surface, plus the constant C. In a practical implementation strategy, A may be from about 5 mm to about 7 mm, and constant C may be from about 0.5 mm to about 1.5 mm. More particularly, A may be about 6 mm and C may be about 1.3 mm. It will thus be understood that in any given piston, $D_{MAX}$ for a repaired defect at 100% of the distance percentage, such as a repaired defect that includes a part of outer perimetric edge 642, may be equal to about A+C. $D_{MAX}$ for a repaired defect positioned 50% of the way from inner perimetric edge 644 to outer perimetric edge 642 may be about A(0.50)+C. With regard to allowable depth of repaired defects, the allowable maximum repaired defect depth may be equal to another constant E multiplied by distance percentage B, and represented by the equation: Defect Depth=E*B. In a practical implementation strategy, E may be about 0.6 mm, more particularly about 0.64 mm. In view of the foregoing mathematical relationships, it will be understood that allowable defect diameter can vary to a relatively greater extent while allowable defect depth can vary to a lesser relative extent. The values disclosed for variables A, C and E are expected to be applicable to repairing pistons having a range of sizes, but could nevertheless be scaled up or down for relatively larger or smaller pistons, as the case may be.

Figure 7:
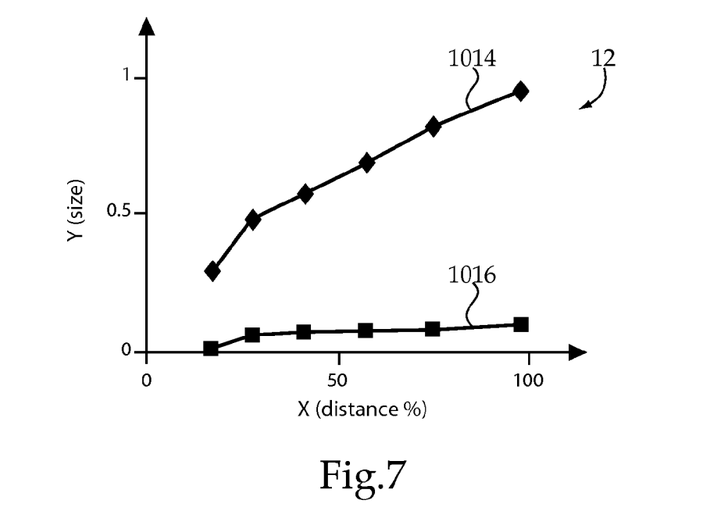
FIG. 7 is a graph illustrating patterns of allowable repaired defect size, according to one embodiment.
Figure 8:
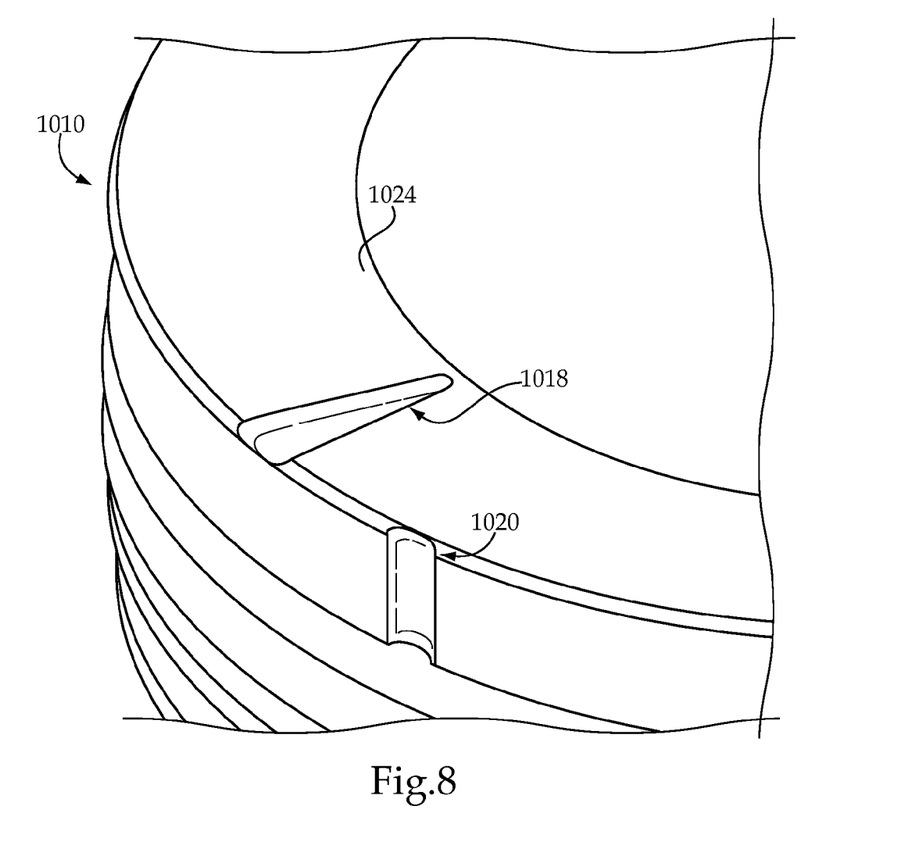
FIG. 8 is a diagrammatic view of a piston graphically illustrating a defect sizing parameter, according to one embodiment.

Referring now to FIG. 7, there is shown a graph 1012 of repaired defect size on the Y-axis versus distance percent, i.e. in the case of piston 610 the percent of the radial distance from inner perimetric edge 640 to outer perimetric edge 642 as determined by a location of a defect, on the X-axis. A defect size of "1" represents a maximum allowable defect size for a piston or class of pistons, and would be applied to repaired defects at outer perimetric edge 642. A first curve 1014 illustrates a range of defect diameters which could be expected where all repaired defects are at or close to maximum allowable diameters. A second curve 1016 analogously illustrates maximum allowable defect depths. It may also be noted that curve 1014 is relatively steeper than curve 1016, that a slope of curve 1014 is slightly less than 1, and that a slope of curve 1016 is considerably smaller than the slope of curve 1014. Hence, allowable repaired defect diameter increases in a radially outward direction to a greater relative extent than allowable repaired defect depth. Referring also now to FIG. 8, there is shown a piston 1010 including a rim 1024 with a first graphic 1018 representing allowable defect diameter and depth in a radially outward direction, and a second graphic 1020 representing allowable defect size and depth in a top land portion of piston 1010. While of course graphics 1018 and 1020 do not represent any typical actual damage in a piston to be repaired, their shapes and sizes enable one to visualize the increasing allowable size of defects in a radially outward direction across rim 1024, and once at the outermost limit of rim 1024, allowable defect size in the top land, which may be substantially the same as allowable defect size at a radially outermost point upon rim 1024.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A repaired piston comprising:
   a piston body defining a longitudinal axis, and including a first body end having a crown, a second body end having a skirt, and an outer body surface extending axially between the first and second body ends and circumferentially around the longitudinal axis;
   the crown being composed of a base material and a welding filler material, and including a combustion face formed by an annular rim extending circumferentially around a combustion bowl and in a radially outward direction from the combustion bowl to the outer body surface;
   the annular rim being formed primarily of the base material and secondarily of the welding filler material, and having within the combustion face a finite number of repaired defects each formed by a void in the base material filled by the welding filler material or by a mixture of the base material and the welding filler material;
   the repaired defects having a spatial distribution limited by a multidirectional spacing parameter, such that a distance, in any direction, between any two of the repaired defects is at least as great as a diameter of either of the two; and
   the repaired defects further having a size distribution limited by a unidirectional sizing parameter varying as a function of distance from the combustion bowl, such that each of the repaired defects has a diameter of about 40% or less of a distance, in the radially outward direction, of the repaired defect from the combustion bowl; and
   the annular rim adjoins the combustion bowl at an inner perimetric edge, and adjoins the outer body surface at an outer perimetric edge, and wherein the repaired defects are located outside of a standback zone in the annular rim free of repaired defects, and wherein the standback zone extends in the radially outward direction from the inner perimetric edge.

2. The piston of claim 1 wherein a radial extent of the standback zone is from about 10% to about 15% of a radial distance from the inner to the outer perimetric edge.

3. The piston of claim 2 wherein the radial extent of the standback zone is about 12% of the radial distance.

4. The piston of claim 3 wherein the radial extent of the standback zone is from about 2 mm to about 3 mm.

5. The piston of claim 1 wherein the diameters include diameters in a plane defined by the annular rim, and wherein the repaired defects have among them, in the radially outward direction, at least one of, progressively increased diameters, and progressively increased depths.

6. The piston of claim 5 wherein the diameters are about 8 mm or less, and the depths are about 1 mm or less.

7. The piston of claim 6 wherein the finite number of repaired defects is less than twenty.

8. A collection of repaired pistons comprising:
a plurality of piston bodies each defining a longitudinal axis, and including a first body end having a crown, a second body end having a skirt, and an outer body surface extending axially between the first and second body ends and circumferentially around the longitudinal axis;
the crowns of each of the plurality of piston bodies being composed of a base material and a welding filler material, and including a combustion face formed by an annular rim extending circumferentially around a combustion bowl and in a radially outward direction from the combustion bowl to the outer body surface;
the annular rims being formed primarily of the base material and secondarily of the welding filler material, and having within the combustion face a finite number of repaired defects each formed by a void in the base material filled by the welding filler material or by a mixture of the base material and the welding filler material;
the repaired defects having a spatial distribution within each of the annular rims limited by a multidirectional spacing parameter, such that a distance, in any direction, between any two repaired defects in any one of the annular rims, as a mean among the collection, is at least as great as a diameter of either of the two; and
the repaired defects further having a size distribution within each of the annular rims limited by a unidirectional sizing parameter varying as a function of distance from the corresponding combustion bowl, and such that the repaired defects have diameters, as a mean among the collection, of about 40% or less of a distance, in the corresponding radially outward directions, of the repaired defects from the corresponding combustion bowl; and
the annular rim adjoins the combustion bowl in each of the plurality of piston bodies at an inner perimetric edge, and adjoins the outer body surface at an outer perimetric edge, and wherein the repaired defects are located outside of a standback zone in the annular rim free of repaired defects, and wherein the standback zone extends in the radially outward direction from the inner perimetric edge.

9. The collection of claim 8 wherein the diameters include diameters in a plane defined by the corresponding annular rim.

10. The collection of claim 9 wherein the diameters are about 8 mm or less, and depths of each of the repaired defects are about 1 mm or less.

11. The collection of claim 8 wherein a radial extent of the standback zone is from about 10% to about 15% of a radial distance from the inner to the outer perimetric edge.

12. A repaired piston comprising:
a piston body defining a longitudinal axis, and including a first body end having a crown, a second body end having a skirt, and an outer body surface extending axially between the first and second body ends and circumferentially around the longitudinal axis;
the crown being composed of a base material and a welding filler material, and including a combustion face formed by an annular rim extending circumferentially around a combustion bowl and in a radially outward direction from the combustion bowl to the outer body surface;
the annular rim being formed primarily of the base material and secondarily of the welding filler material, and having within the combustion bowl a finite number of repaired defects each formed by a void in the base material filled by the welding filler material or by a mixture of the base material and the welding filler material;
the repaired defects having a spatial distribution limited by a multidirectional spacing parameter, such that a distance, in any direction, between any two of the repaired defects is at least as great as a diameter of either of the two; and
the repaired defects further having a size distribution limited by a unidirectional sizing parameter varying as a function of distance from the combustion bowl in the radially outward direction, and such that a diameter of each of the repaired defects is equal to or less than $D_{MAX}$ according to the equation:

$$D_{MAX} = A*B+C$$

where:
A and C are constants; and
B is the percentage of a distance from the combustion bowl to the outer body surface, determined by a location of the repaired defect; and
the annular rim adjoins the combustion bowl at an inner perimetric edge, and adjoins the outer body surface at an outer perimetric edge, and wherein the repaired defects are located outside of a standback zone in the annular rim free of repaired defects, and wherein the standback zone extends in the radially outward direction from the inner perimetric edge.

13. The piston of claim 12 wherein A is from about 5 mm to about 7 mm, and C is from about 0.5 mm to about 1.5 mm.

14. The piston of claim 13 wherein the repaired defects include a first repaired defect and a second repaired defect positioned at first and second distances from the combustion bowl, and having first and second diameters, respectively, each equal to $D_{Max}$ as computed according to the equation.

15. The piston of claim 12 wherein a radial extent of the standback zone is from about 10% to about 15% of a radial distance from the inner to the outer perimetric edge.

16. The piston of claim 15 wherein the radial extent is from about 2 mm to about 3 mm, and the radial distance is from about 15 mm to about 30 mm.

17. The piston of claim 15 wherein the diameters of each of the repaired defects include diameters in a plane defined by the annular rim, and wherein the diameters are about 8 mm or less, and each of the repaired defects has a depth of about 1 mm or less.

* * * * *